United States Patent
Jin et al.

(10) Patent No.: US 11,948,485 B2
(45) Date of Patent: Apr. 2, 2024

(54) ELECTRONIC APPARATUS AND METHOD FOR CONTROLLING THEREOF

(71) Applicant: Samsung Electronics Co., Ltd., Suwon-si (KR)

(72) Inventors: Bora Jin, Suwon-si (KR); Youngjin Yoon, Suwon-si (KR); Jihye Lee, Suwon-si (KR); Yeoul Lee, Suwon-si (KR); Sunil Lee, Suwon-si (KR); Jaesung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/567,565

(22) Filed: Jan. 3, 2022

(65) Prior Publication Data

US 2022/0208047 A1   Jun. 30, 2022

Related U.S. Application Data

(63) Continuation of application No. PCT/KR2021/017782, filed on Nov. 29, 2021.

(30) Foreign Application Priority Data

Dec. 24, 2020   (KR) .................. 10-2020-0183842

(51) Int. Cl.
*G09G 3/00*   (2006.01)

(52) U.S. Cl.
CPC ............. *G09G 3/007* (2013.01); *G09G 3/003* (2013.01); *G09G 2300/023* (2013.01)

(58) Field of Classification Search
CPC ......... H04N 2013/0081; H04N 13/128; H04N 13/232; H04N 13/239; H04N 13/271;
(Continued)

(56) References Cited

U.S. PATENT DOCUMENTS 8,848,006 B2    9/2014  Wetzstein et al.
10,664,953 B1*  5/2020  Lanman ............. G02B 27/0172
(Continued)

FOREIGN PATENT DOCUMENTS

KR   10-2017-0083419 A   7/2017
KR     10-1868405 B1     6/2018
(Continued)

OTHER PUBLICATIONS

International Search Report and Written Opinion dated Mar. 3, 2022, issued in International Patent Application No. PCT/KR2021/017782.

(Continued)

*Primary Examiner* — Michael A Faragalla
(74) *Attorney, Agent, or Firm* — Jefferson IP Law, LLP

(57) ABSTRACT

An electronic apparatus and a method for controlling thereof are provided. The method includes acquiring a first Light field (LF) image of different viewpoints, inputting the first LF image to a first artificial intelligence model to acquire a pixel shift value for converting pixels in the first LF image, converting the pixels in the first LF image according to the pixel shift value to acquire a second LF image, inputting the first LF image and the second LF image to a second artificial intelligence model for converting the LF image to a layer image to acquire the layer image, inputting the acquired layer image to a simulation model for restoring the LF image to acquire a third LF image, and learning the first artificial intelligence model and the second artificial intelligence model based on the second LF image and the third LF image.

18 Claims, 15 Drawing Sheets

(58) Field of Classification Search
CPC .... H04N 13/15; H04N 13/156; H04N 13/161; H04N 13/178; H04N 13/236; H04N 13/243; G09G 3/007; G09G 3/003; G09G 2300/023
See application file for complete search history.

(56) References Cited

U.S. PATENT DOCUMENTS

| | | | |
|---|---|---|---|
| 11,381,790 | B2 | 7/2022 | Nakagoshi |
| 2006/0158455 | A1 | 7/2006 | Yoshino |
| 2017/0098172 | A1 | 4/2017 | Ellenbogen et al. |
| 2018/0008141 | A1* | 1/2018 | Krueger ............... A61B 3/0025 |
| 2019/0122373 | A1 | 4/2019 | Natroshvili et al. |
| 2020/0012940 | A1 | 1/2020 | Liu et al. |
| 2020/0125893 | A1 | 4/2020 | Choi et al. |
| 2020/0154096 | A1 | 5/2020 | Kim |
| 2020/0302235 | A1* | 9/2020 | Turcot .................. G06N 3/045 |
| 2020/0357099 | A1 | 11/2020 | Long et al. |
| 2021/0209388 | A1* | 7/2021 | Ciftci ..................... G06V 40/45 |
| 2021/0383190 | A1 | 12/2021 | Park et al. |
| 2023/0121124 | A1* | 4/2023 | Rhee .................... H04N 13/254 345/426 |

FOREIGN PATENT DOCUMENTS

| | | |
|---|---|---|
| KR | 10-2019-0132415 A | 11/2019 |
| KR | 10-2020-0046188 A | 5/2020 |
| KR | 10-2020-0089588 A | 7/2020 |

OTHER PUBLICATIONS

Keita Takahashi et al., "From Focal Stack to Tensor Light-Field Display," IEEE Transactions on Image Processing, vol. 27, No. 9, pp. 4571-4584, Sep. 2018.

* cited by examiner (0,0)

BACK SURFACE: $(-S_{ny}, -S_{nx})$
MIDDLE SURFACE: $(0,0)$
FRONT SURFACE: $(S_{ny}, S_{nx})$ (0,2)

BACK SURFACE: $(-S_{ny}, S_{nx})$
MIDDLE SURFACE: $(0,0)$
FRONT SURFACE: $(S_{ny}, -S_{nx})$ (1,0)

BACK SURFACE: $(0, -S_{nx})$
MIDDLE SURFACE: $(0,0)$
FRONT SURFACE: $(0, S_{nx})$ (2,1)

BACK SURFACE: $(S_{ny}, 0)$
MIDDLE SURFACE: $(0,0)$
FRONT SURFACE: $(-S_{ny}, 0)$

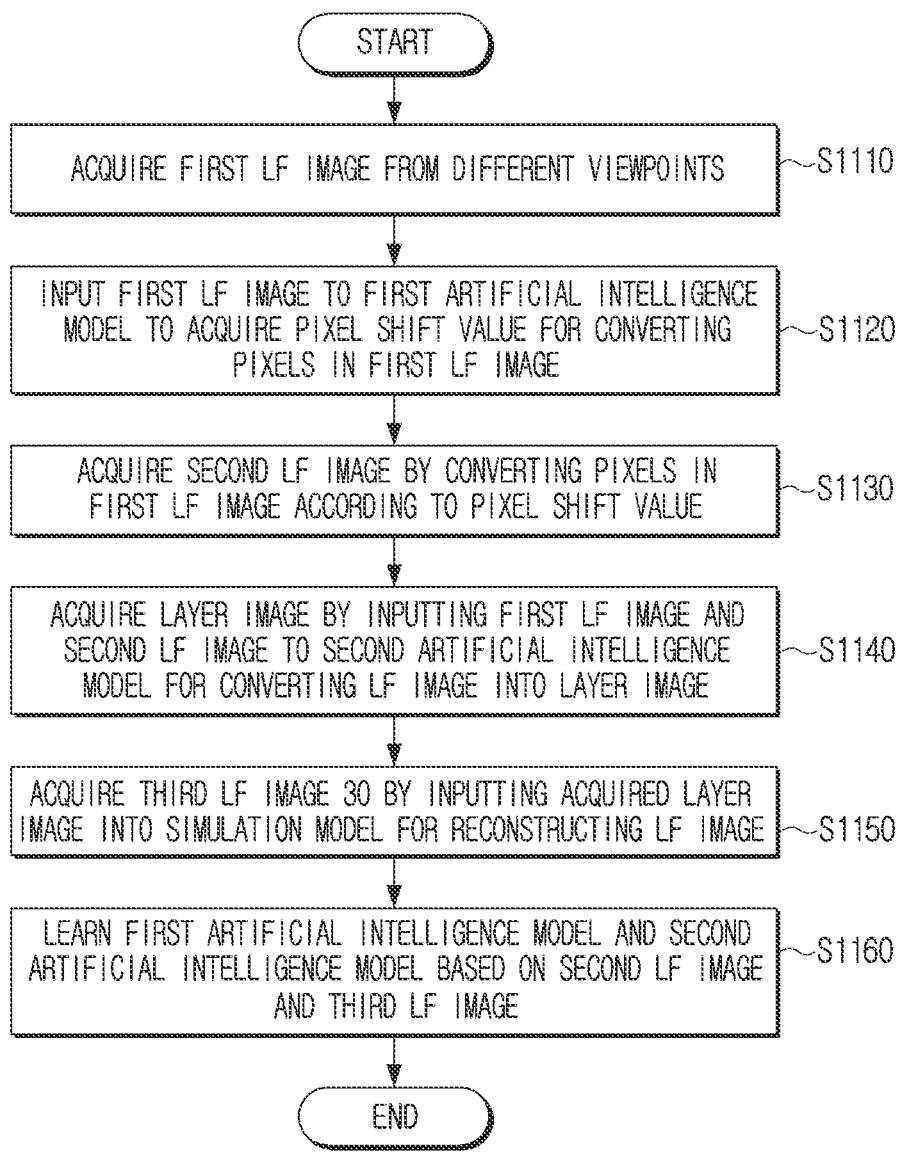

ELECTRONIC APPARATUS AND METHOD FOR CONTROLLING THEREOF

CROSS-REFERENCE TO RELATED APPLICATION(S)

This application is a continuation application, claiming priority under § 365(c), of an International application No. PCT/KR2021/017782, filed on Nov. 29, 2021, which is based on and claims the benefit of a Korean patent application number 10-2020-0183842, filed on Dec. 24, 2020, in the Korean Intellectual Property, the disclosure of which is incorporated by reference herein in its entirety.

TECHNICAL FIELD

The disclosure relates to an electronic apparatus and a method for controlling thereof. More particularly, the disclosure relates to an electronic apparatus for acquiring an image provided to a stacked display device and a method for controlling thereof.

BACKGROUND ART

A method of displaying an image using a stacked display device has been proposed in order to express a three-dimensional effect of the image according to the related art. The stacked display device may be implemented by stacking two or more display panels, and an image may be displayed on each of the two or more display panels to provide an image reflecting a three dimensional (3D) depth.

However, in the case of the existing stacked display device, there is a limit to a range of depth that can be expressed, and when an image is provided through an Light Field (LF) image which is out of the depth range, there may be a problem in that image quality, resolution, or expression quality of a viewing angle of an area outside the depth range in the LF image is deteriorated. Here, the depth range is an actual distance range between objects in the image that can be expressed in the 3D image, and the depth refers to a degree to which the objects in the 3D image are close. When the 3D depth is to be expressed only with a layer image corresponding to the number of panels of the stacked display, there may be a problem that all objects in the image cannot be expressed. In other words, in order to improve an expression quality of a relatively close object in the image, an expression quality of a relatively distant object in the image is inevitably reduced. Accordingly, in the related art, a range of distances between objects in an image that can be expressed in one layer image is inevitably limited.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic apparatus for acquiring an image provided to a stacked display device by using an LF image converted from an LF image to be suitable for the stacked display device, and a method for controlling thereof.

Additional aspects will be set forth in part in the description which follows and, in part, will be apparent from the description, or may be learned by practice of the presented embodiments.

Technical Solution

In accordance with an aspect of the disclosure, a method for controlling an electronic apparatus is provided. The method includes acquiring a first LF image of different viewpoints, inputting the first LF image to a first artificial intelligence model to acquire a pixel shift value for converting pixels in the first LF image, converting the pixels in the first LF image according to the pixel shift value to acquire a second LF image, inputting the first LF image and the second LF image to a second artificial intelligence model for converting the LF image to a layer image to acquire the layer image, inputting the acquired layer image to a simulation model for restoring the LF image to acquire a third LF image, and learning the first artificial intelligence model and the second artificial intelligence model based on the second LF image and the third LF image.

The acquiring the second LF image may include moving, according to a pixel shift value corresponding to each of a plurality of view images included in the first LF image, pixels of each of the plurality of view images to acquire the second LF image.

The acquiring the second LF image may include moving, according to a first pixel shift value corresponding to a first view image, pixels in the first view image included in the first LF image to acquire the first view image of the second LF image.

The pixel shift value may include a sub-pixel shift value corresponding to each pixel, and wherein the acquiring the first view image of the second LF image includes moving each pixel in the first view image included in the first LF image according to the sub-pixel shift value included in the first pixel shift value to acquire the first view image of the second LF image.

The acquiring the layer image may include inputting the first LF image, the second LF image, and the pixel shift value to the second artificial intelligence model to acquire the layer image.

The layer image may include a first layer image, a second layer image, and a third layer image, and wherein the acquiring the third LF image includes shifting each of the first layer image and the third layer image for each view point, and cropping the shifted first layer image and the shifted third layer image together with the second layer image to acquire the third LF image.

The learning may include comparing the second LF image with the third LF image to acquire a loss function, and learning the first artificial intelligence model and the second artificial intelligence model based on the loss function.

The method may further include inputting the first LF image to the learned first artificial intelligence model to acquire the pixel shift value, converting the pixels in the first LF image according to the pixel shift value to acquire the second LF image, and inputting the first LF image and the second LF image to the learned second artificial intelligence model to acquire a layer image.

The method may further include inputting the first LF image to the learned first artificial intelligence model to acquire the pixel shift value, and inputting the first LF image and the pixel shift value to the learned second artificial intelligence model to acquire the layer image.

The method may further include providing the layer image to a stacked display.

In accordance with another aspect of the disclosure, an electronic apparatus is provided. The electronic apparatus includes a memory for storing at least one instruction, and a processor for executing at least one instruction stored in the memory to control the electronic apparatus, wherein the processor is configured to acquire a first LF image of different viewpoints, input the first LF image to a first artificial intelligence model to acquire a pixel shift value for converting pixels in the first LF image, convert the pixels in the first LF image according to the pixel shift value to acquire a second LF image, input the first LF image and the second LF image to a second artificial intelligence model for converting the LF image to a layer image to acquire the layer image, input the acquired layer image to a simulation model for restoring the LF image to acquire a third LF image, and learn the first artificial intelligence model and the second artificial intelligence model based on the second LF image and the third LF image.

The processor may move, according to a pixel shift value corresponding to each of a plurality of view images included in the first LF image, pixels of each of the plurality of view images to acquire the second LF image.

The processor may move, according to a first pixel shift value corresponding to a first view image, pixels in the first view image included in the first LF image to acquire the first view image of the second LF image.

The pixel shift value may include a sub-pixel shift value corresponding to each pixel, and wherein the processor is configured to move each pixel in the first view image included in the first LF image according to the sub-pixel shift value included in the first pixel shift value to acquire the first view image of the second LF image.

The processor may input the first LF image, the second LF image, and the pixel shift value to the second artificial intelligence model to acquire the layer image.

The layer image may include a first layer image, a second layer image, and a third layer image, and wherein the acquiring the third LF image includes shifting each of the first layer image and the third layer image for each view point, and cropping the shifted first layer image and the shifted third layer image together with the second layer image to acquire the third LF image.

The processor may compare the second LF image with the third LF image to acquire a loss function, and learn the first artificial intelligence model and the second artificial intelligence model based on the loss function.

The processor may input the first LF image to the learned first artificial intelligence model to acquire the pixel shift value, convert the pixels in the first LF image according to the pixel shift value to acquire the second LF image, and input the first LF image and the second LF image to the learned second artificial intelligence model to acquire a layer image.

The processor may input the first LF image to the learned first artificial intelligence model to acquire the pixel shift value, and input the first LF image and the pixel shift value to the learned second artificial intelligence model to acquire the layer image.

The processor may provide the layer image to a stacked display.

Advantageous Effects

Through the embodiments described above, the electronic apparatus may convert the LF image to suit the depth range that can be expressed by the stacked display, and acquire the layer image through the converted LF image, thereby acquiring a layer image with improved expression quality.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIG. 11 is a flowchart illustrating a method of controlling an electronic apparatus, according to an embodiment of the disclosure.

BEST MODE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
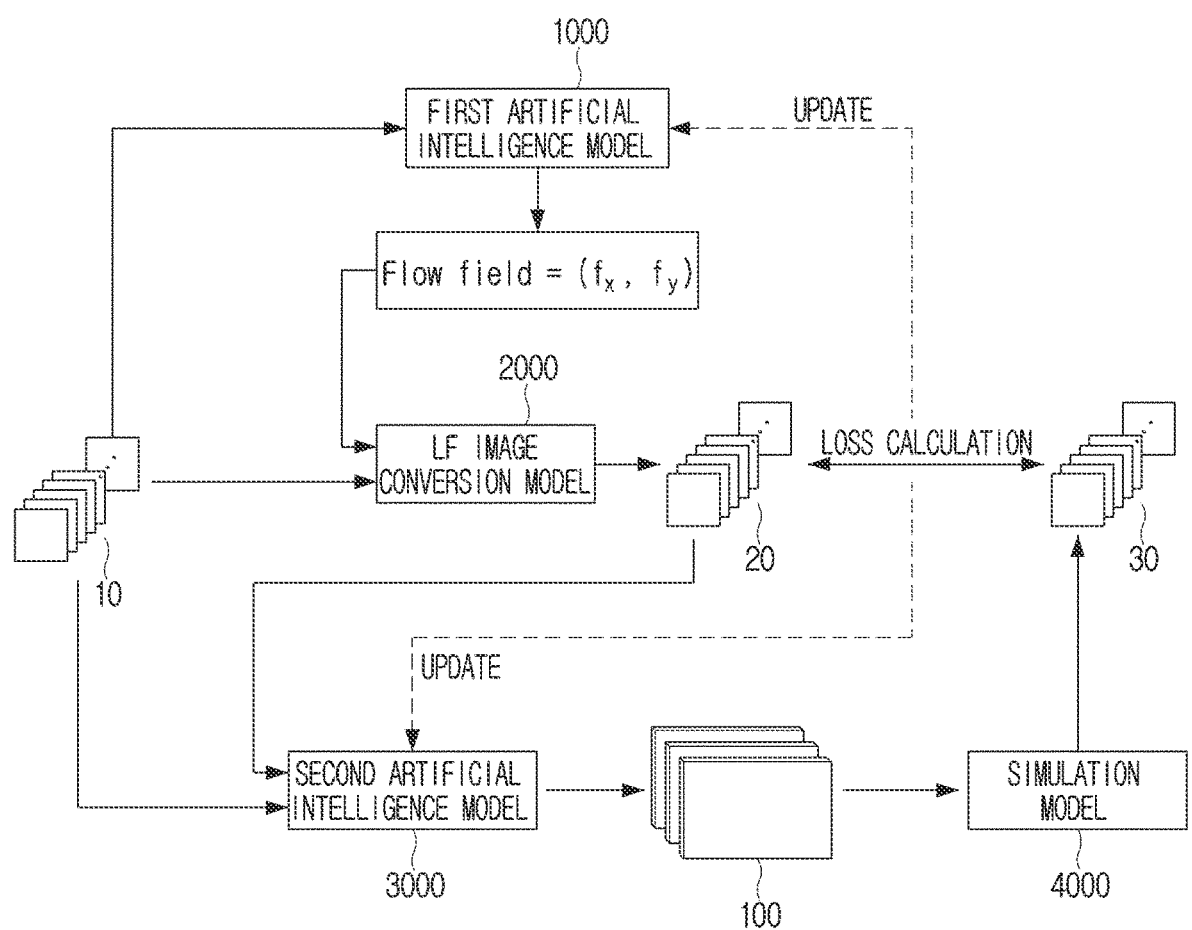
FIG. 1 is a view illustrating a learning process of first and second artificial intelligence models for acquiring a layer image, according to an embodiment of the disclosure.

FIG. 1 is a view illustrating a learning process of first and second artificial intelligence models for acquiring a layer image, according to an embodiment of the disclosure.

Referring to FIG. 1, by learning a first artificial intelligence model 1000 and a second artificial intelligence model 3000, an electronic apparatus may acquire a layer image in which an area outside a depth range that a stacked display device can express is corrected. The electronic apparatus according to the disclosure is an electronic apparatus for learning the first artificial intelligence model 1000 and the second artificial intelligence model 3000 for acquiring a layer image 100, and providing the acquired layer image 100 to an external stacked display device. However, the disclosure is not limited thereto, and the electronic apparatus may include a stacked display.

The layer image 100 according to the disclosure is an image to be displayed on a stacked display, and refers to an image in which another side of an object in the image is visible to the user according to the user's view point (or the user's location). For example, when the user looking at the stacked display device moves to the left, a left part of the object in the layer image 100 may be more visible to the user. As an example, the layer image may be referred to as a layer stack.

In order to learn the first artificial intelligence model 1000 and the second artificial intelligence model 3000 according to FIG. 1, the electronic apparatus may acquire a first LF image 10 from different viewpoints.

A light field (LF) image refers to a set of a plurality of images in which at least one object is photographed from different viewpoints through an LF camera. In other words, the LF image refers to a set of a plurality of view images acquired by photographing light reflected from a specific object, from a plurality of different viewpoints. In addition, according to the disclosure, the first LF image 10 may be converted into a layer image 100 for displaying on the stacked display through a factorization technique.

For example, when the electronic apparatus includes the LF camera, the electronic apparatus may acquire the first LF image 10 from the LF camera. As another example, the electronic apparatus may receive and acquire the first LF image 10 from an external server or an external LF camera.

In addition, the electronic apparatus may input the first LF image 10 to the first artificial intelligence model 1000 to acquire a pixel shift value f for converting each pixel of the first LF image 10.

The first artificial intelligence model 1000 according to the disclosure is an artificial intelligence model for acquiring a pixel shift value corresponding to the first LF image 10, for example, an artificial intelligence model based on a deep neural network (DNN).

According to the disclosure, the pixel shift value is a pixel shift value for changing a depth of an area outside a depth range in an image such that image quality, resolution, or the expression quality of a viewing angle of the area outside the depth range that can be expressed in the image is not deteriorated. In other words, the pixel shift value is a value for shifting a pixel of one area in the image. The pixel shift value may be referred to as, for example, a flow value $f=(f_x, f_y)$. Alternatively, the pixel shift value may be referred to as a flow field value.

In addition, the electronic apparatus may acquire a second LF image 20 by converting pixels of view images included in the first LF image 10 based on the pixel shift value.

In other words, the electronic apparatus may perform a warping technique of moving pixels of the view images included in the first LF image 10 according to the pixel shift value through a LF image conversion model 2000 to acquire the second LF image 20. The second LF image 20 is an LF image in which the first LF image 10 is warped according to a pixel shift value. The warping technique is a technique of moving each pixel according to a pixel shift value corresponding to each pixel in an image. In addition, the LF image conversion model 2000 is a model for warping each view image according to a pixel shift value corresponding to each view image included in the first LF image 10. Details of the warping technique will be described below with reference to FIGS. 3 and 4.

In other words, when the pixel shift value with respect to the first LF image 10 is acquired through the first artificial intelligence model 1000, the LF image conversion model 2000 may move, based on the pixel shift value, pixels of each of the view images included in the first LF image 10. In other words, the LF image conversion model 2000 may acquire the second LF image 20 by warping each view image in the first LF image 10 through the pixel shift value.

Specifically, in the case of the first LF image including as many view images as the number of (2u+1)×(2v+1) view, the pixel shift value may not be applied to a view image corresponding to a center view (u, v) in the LF image conversion model 2000 ($f_{(u, v)}=(0,0)$). In addition, pixel shift value $f(u+1, v+1)=(f_x, f_y)$ may be applied to a view image corresponding to (u+1, v+1) in order to move pixels.

In other words, in a view image corresponding to (m, n) view, pixels may be moved by using a pixel shift value corresponding to the (m, n) view, and the pixel shift value $f_{(m,n)}$ corresponding to the (m, n) view image may be $((m-u)*f_x, (n-v)*f_y)$. Details on this will be described below with reference to FIGS. 3 and 4.

In addition, the pixel shift values ($f_x, f_y$) may be different for each pixel in the image. In other words, the pixel shift value is different according to a location of the pixel in the image, and the thing that a sub-pixel shift value is different for each pixel in the image may be learned through the first artificial intelligence model 1000. The example of the sub-pixel shift value described above is only an example for conceptual description, and the disclosure is not limited thereto. In other words, backward warping may be applied. Also, the electronic apparatus may calculate a sub-pixel shift value for one pixel by weighted summation of pixels adjacent to one pixel in the view image, by applying bilinear sampling.

For example, in (u+1, v+1) view image, a sub-pixel shift value corresponding to a (1,1) pixel that is out of a depth range that can be expressed in the stacked display device may be smaller than a sub-pixel shift value corresponding to a (8, 8) pixel that is not out of the depth range. In other words, $f_x$ is a movement value for moving one pixel in one image on an x-axis, and $f_y$ is a movement value for moving one pixel in one image on an y-axis, and the pixel shift value $(f_x, f_y)$ may be different for each pixel in the image.

When the second LF image is acquired through the LF image conversion model 2000, the electronic apparatus may input the first LF image 10 and the second LF image 20 into the second artificial intelligence model 3000 to acquire the layer image 100.

The second artificial intelligence model 3000 is an artificial intelligence model for converting an LF image into a layer image through a factorization technique, and may be, for example, an artificial intelligence model based on a deep neural network (DNN).

The layer image 100 is an image provided to the stacked display device, and may be configured in a number corresponding to the number of panels of the stacked display device. In other words, the layer image 100 may be respectively displayed on each panel of the stacked display device to provide a stereoscopic image. For example, the layer image 100 to be provided to the stacked display device including three panels may be composed of a first layer image, a second layer image, and a third layer image. In addition, a first layer image may be displayed on a first panel of the stacked display device, a second layer image may be displayed on a second panel, and a third layer image may be displayed on a third panel, thereby providing a stereoscopic image.

The layer image 100 may be acquired by factoring the LF image through the second artificial intelligence model 3000, and the second artificial intelligence model 3000 according to the disclosure may acquire the layer image 100 by using the first LF image and the second LF image in which the first LF image is warped.

In the embodiment described above, it has been described that the layer image 100 is acquired by inputting the first LF image 10 and the second LF image 20 to the second artificial intelligence model 3000, but the disclosure is limited thereto. In other words, the first LF image 10 and the pixel shift values acquired from the first artificial intelligence model 1000 may be input to the second artificial intelligence model 3000 to acquire the layer image 100.

When the layer image 100 is acquired, the electronic apparatus may restore the layer image 100 in a LF image format through a simulation model 4000 to learn the first artificial intelligence model 1000 and the second artificial intelligence model 3000.

In other words, the electronic apparatus may restore the layer image 100 into a third LF image 30 through the simulation model 4000. The third LF image 30 is an image in which the layer image 100 is restored in the LF image format, and is an LF image for learning an artificial intelligence model by comparison with an existing LF image.

The simulation model 4000 may acquire the third LF image 30 including a plurality of view images by shifting the plurality of layer images 100 for each view. A detailed method of restoring the layer image 100 into the third LF image 30 will be described below with reference to FIGS. 5A, 5B, and 5C.

When the third LF image 30 is acquired, the electronic apparatus may compare the second LF image 20 with the third LF image 30 to acquire the first artificial intelligence model 1000 and the second artificial intelligence model 3000. Specifically, the electronic apparatus may compare the second LF image 20 with the third LF image 30 to acquire a loss function, calculate a loss based on the loss function, and learn the first artificial intelligence model 1000 and the second artificial intelligence model 3000.

In other words, according to the disclosure, the first artificial intelligence model 1000 and the second artificial intelligence model 3000 may be learned using a common loss function. The loss function represents an index indicating a current learning state of an artificial intelligence model. Specifically, the loss function is an index indicating a poor current performance of the artificial intelligence model, and the artificial intelligence model may be learned in a way that the loss function decreases.

As an example, the loss function may be calculated as in Equation 1.

$$l_1 \text{loss} + \lambda_1 ssim + \lambda_2 \|\nabla f\|_2 \qquad \text{Equation 1}$$

In Equation 1, $l_1$ means a sum of absolute values of an error (difference) between the second LF image 20 and the third LF image 30 as a L1 norm, and $l_2$ is a mean square error concept, meaning a sum of squares of an error L2 norm.

In addition, $\lambda_1$ and $\lambda_2$ are weights given to adjust a ratio between losses, and may be experimentally set by the user as hyper parameters. SSIM means a structural similarity index, a kind of image quality metric such as MSE and PSNR, and may be used in combination with L1 loss to measure structural similarity. And, f indicates a pixel shift value acquired through the first artificial intelligence model 1000.

When the loss function is acquired, the electronic apparatus may learn the first artificial intelligence model 1000 and the second artificial intelligence model 3000 in a way that the loss function decreases.

Then, the electronic apparatus may repeat the learning process described above to continuously learn the first artificial intelligence model 1000 and the second artificial intelligence model 3000.

In addition, the electronic apparatus may acquire a layer image in which an area out of a depth range that can be expressed by the stacked display device is corrected by using the first artificial intelligence model 1000 and the second artificial intelligence model 3000 that have been learned. In addition, the electronic apparatus may provide a layer image to the stacked display device.

Figure 2:
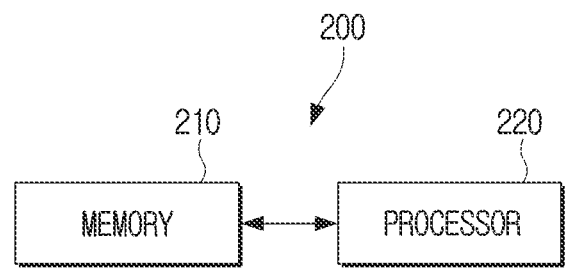
FIG. 2 is a block diagram illustrating a configuration of an electronic apparatus according to an embodiment of the disclosure.

FIG. 2 is a block diagram illustrating a configuration of an electronic apparatus according to an embodiment of the disclosure.

Referring to FIG. 2, an electronic apparatus 200 may include a memory 210 and a processor 220.

The memory 210 may store various programs and data necessary for the operation of the electronic apparatus 200.

To be specific, the memory 210 may include at least one instruction. The processor 220 may perform the operation of the electronic apparatus 200 by executing an instruction stored in the memory 210.

The memory 210, for example, may store a command or data regarding at least one of the other elements of the electronic apparatus 200. The memory 210 may be implemented as a non-volatile memory, a volatile memory, a flash memory, a hard disk drive (HDD) or a solid state drive (SDD). The memory 210 may be accessed by the processor 220, and perform readout, recording, correction, deletion, update, and the like, on data by the processor 220. According to an embodiment of the disclosure, the term of the storage may include the storage, read-only memory (ROM) (not illustrated) and random access memory (RAM) (not illustrated) within the processor 220, and a memory card (not illustrated) attached to the electronic apparatus 200 (e.g., micro secure digital (SD) card or memory stick).

Functions related to artificial intelligence according to the disclosure may be operated through the processor 220 and the memory 210.

The processor 220 may include one or a plurality of processors. In this case, the one or more processors may be a general-purpose processor such as a central processing unit (CPU), an application processor (AP), or the like, and a graphics-only processor such as a graphics processing unit (GPU), a visual processing unit (VPU), or the like, or an AI-only processor, such as a neural processing unit (NPU).

One or a plurality of processors control to process input data according to a predefined operation rule or artificial intelligence model stored in the memory. The predefined action rule or artificial intelligence model is characterized in that it is generated through learning. Here, being generated through learning means that a predefined operation rule or artificial intelligence model with desired characteristics is generated by applying a learning algorithm to a plurality of learning data. Such learning may be performed in a device itself on which the artificial intelligence according to the disclosure is performed, or may be performed through a separate server/system.

The artificial intelligence model may be composed of a plurality of neural network layers. Each layer may have a plurality of weight values, and a layer operation may be performed through an operation of a previous layer and the operation of the plurality of weights. Examples of neural networks may include convolutional neural network (CNN), deep neural network (DNN), recurrent neural network (RNN), restricted Boltzmann machine (RBM), deep belief network (DBN), bidirectional recurrent deep neural network (BRDNN) and deep Q-network, and the neural network in the disclosure is not limited to the example described above, except as otherwise specified.

The processor 220 may control an overall operation of the electronic apparatus 200 by using various types of programs stored in the memory 210.

Figure 3:
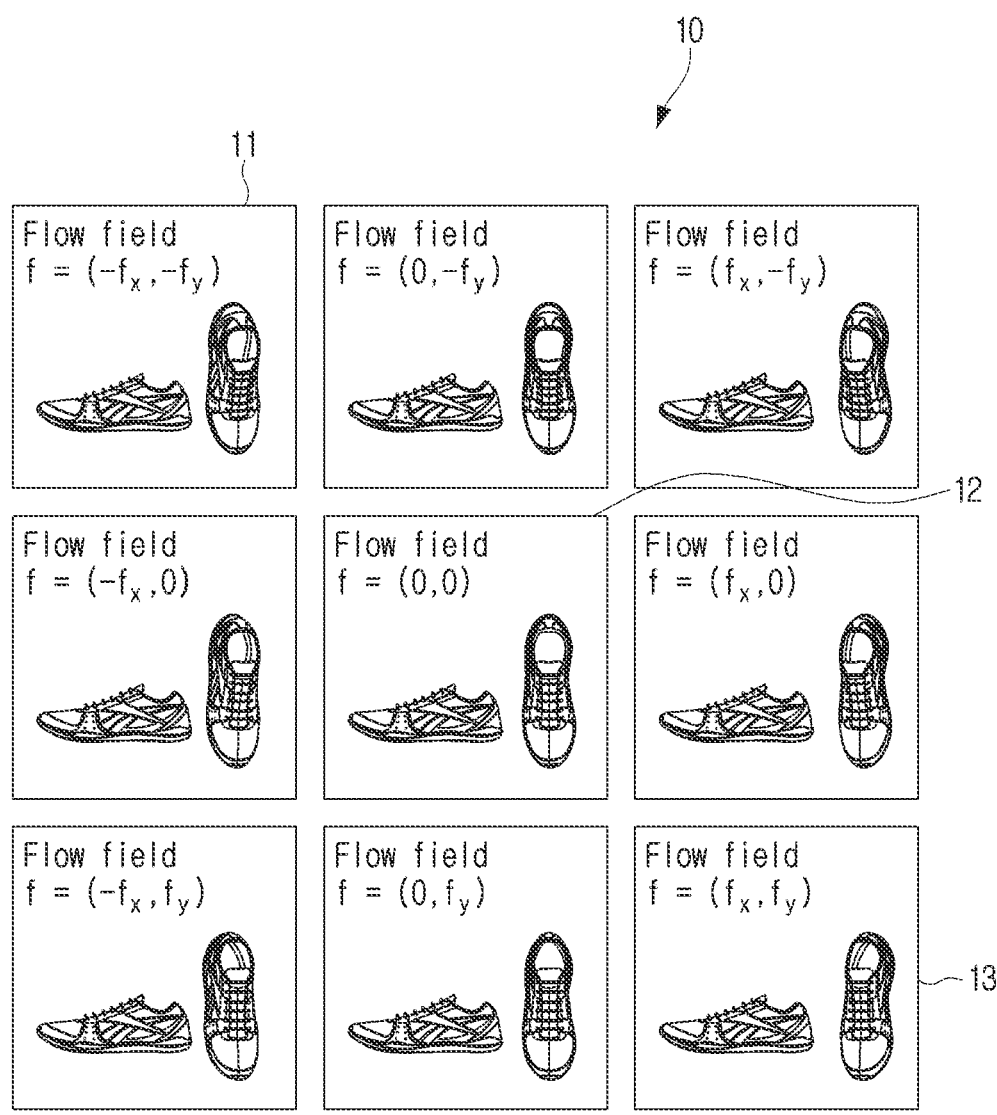
FIG. 3 is a view illustrating a first LF image of a 3×3 view according to an embodiment of the disclosure.

Specifically, the processor 220 may acquire a first LF image 10 at different viewpoints by executing at least one instruction stored in the memory 210. In one embodiment, the processor 220 may receive the first LF image 10 from the LF camera when receiving the first LF image 10 from an external server or an external device, or when the electronic apparatus 200 includes the LF camera. In addition, the first LF image 10 according to the disclosure may include as many view images as the number of (2u+1)×(2v+1) views, and for example, the first LF image 10 may include a view image as many as 3×3 views as shown in FIG. 3.

In addition, the processor 220 may input the first LF image 10 to the first artificial intelligence model to acquire a pixel shift value for converting pixels of the view image in the first LF image. In other words, as described above in FIG. 1, the processor 220 may input the first LF image 10 of the (2u+1)×(2v+1) view to the first artificial intelligence model to acquire a pixel shift value f(u+1, v+1)=($f_x$, $f_y$) corresponding to (u+1, v+1) view image.

Then, the processor 220 may acquire the second LF image by converting pixels of the view images in the first LF image according to the pixel shift value. As an embodiment, the processor 220 may acquire a second LF image by moving the pixels of each of the plurality of view images according to the pixel shift value corresponding to each of the plurality of view images included in the first LF image. Specifically, the processor 220 may move pixels in the first view image included in the first LF image according to the first pixel shift value corresponding to the first view image to acquire the first view image of the second LF image.

In other words, the processor 220 may acquire a view image of the second LF image by moving pixels in (m, n) view image of the first LF image according to the pixel shift value $f_{(m,n)}=((m-u)*f_x, (n-v)*f_y)$ corresponding to the (m, n) view image.

FIG. 3 is a view illustrating a first LF image of a 3×3 view according to an embodiment of the disclosure.

Figure 4:
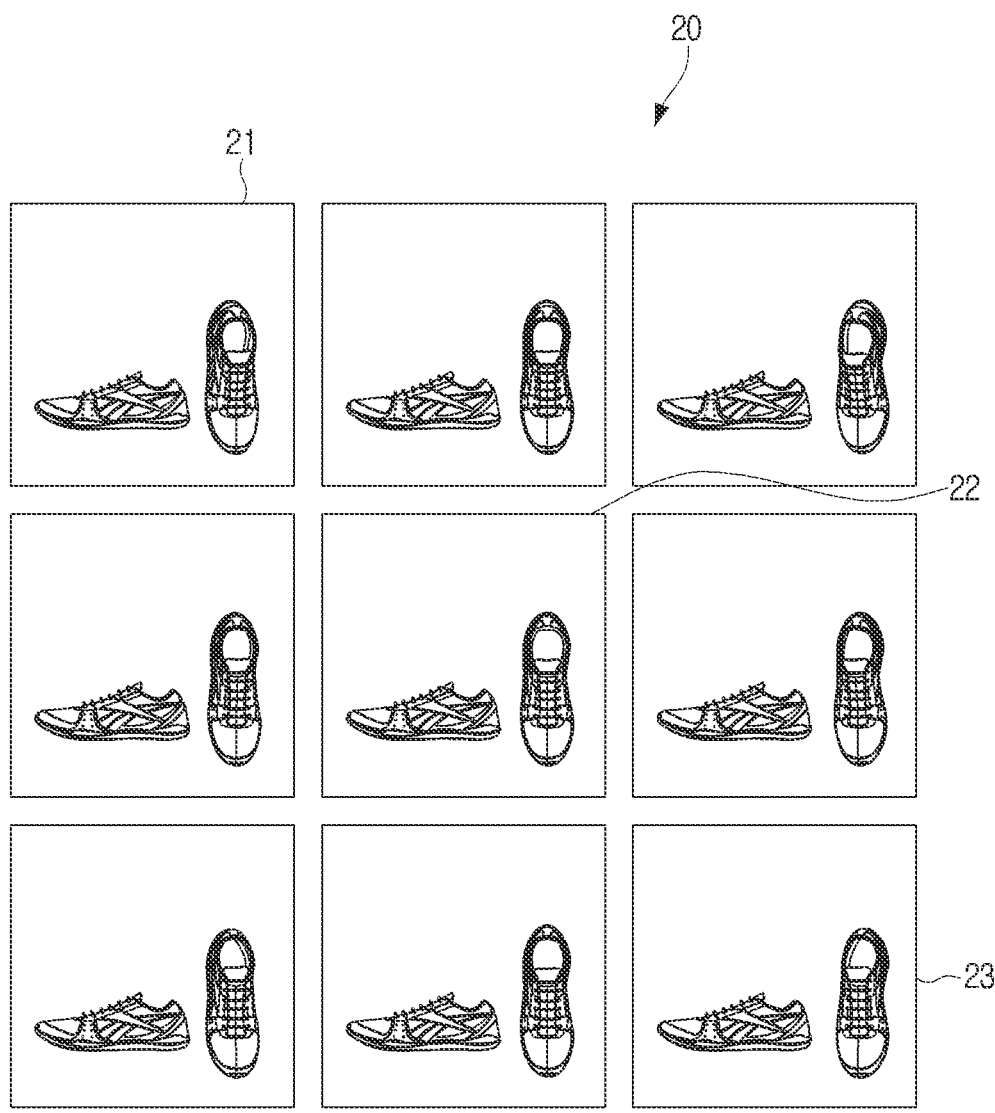
FIG. 4 is a view illustrating a second LF image acquired by converting a first LF image of FIG. 3 according to a pixel shift value according to an embodiment of the disclosure.

FIG. 4 is a view illustrating a second LF image acquired by converting a first LF image of FIG. 3 according to a pixel shift value according to an embodiment of the disclosure.

For example, in the case of the first LF image 10 having a 3×3 view where u=1 and v=1 as shown in FIG. 3, the processor 220 may convert pixels in a first view image 11 that is a (0,0) view according to a first pixel shift value $f_{(0,0)}=(-f_x, -f_y)$ corresponding to the first view image 11, and acquire a first view image 21 in FIG. 4. In addition, the processor 220 may acquire a second view image 22 of FIG. 4 without moving pixels in the second view image, which is (1, 1) view, according to a second pixel shift value $f_{(1,1)}=$ (0,0) corresponding to the second view image 12.

The processor 220 may convert pixels in a third view image 13, which is a (2,2) view, according to a third pixel shift value $f_{(2,2)}=(f_x, f_y)$) corresponding to a third pixel shift value corresponding to the third view image 13, and acquire a third view image 23 of FIG. 4. The processor 220 may acquire the second LF image 20 of FIG. 4 by performing the process described above for all of the first LF image 10 of FIG. 3.

For example, the second view image 12 that is a (1,1) view may be an image observed from a front of an object in the first LF image 10, and the first view image 11, which is a (0,0) view, may be an image that the object in the first LF image 10 is observed from an upper left ((−1, −1) view based on the front) relative to the (1, 1) view. And, the third view image 13, which is the (2,2) view, may be an image that the object (1,1) view in the first LF image 10 is observed from a lower right ((1, 1) view based on the front) relative to the (1, 1) view. For example, each view of the LF image of FIG. 3 may be the user's monocular reference view. In other words, when the user observes with both eyes, a plurality of view images may be observed by the user in the first LF image 10.

And, according to an embodiment of the disclosure, the pixel shift value may include sub-pixel shift values corresponding to each pixel. In other words, a pixel shift value for moving a pixel may be different depending on a pixel in one view image.

Then, the processor 220 may move each pixel in the first view image 11 included in the first LF image 10 according to a sub-pixel shift value included in the first pixel shift value, and acquire the first view image 21 of the second LF image 20. As an example, if the sub-pixel shift value corresponding to the (1,1) pixel location in the view image corresponding to (u+1, v+1) in the first LF image of (2u+1)×(2v+1) view is $(f_{x(1,1)}, f_{y(1,1)})=(1,1)$, the electronic apparatus may perform warping by moving (1,1) pixels by (1,1) pixel in the view image corresponding to (u+1, v+1). And, if the sub-pixel shift value corresponding to the (2, 2) pixel location in the view image is $(f_{x(2,2)}, f_{y(2,2)}))=(0.5, 0.5)$, the electronic apparatus may move the (2, 2) pixel by (0.5, 0.5) pixel to perform warping.

In addition, the processor 220 may acquire the layer image 100 by inputting the first LF image 10 and the second LF image 20 to the second artificial intelligence model for converting the LF image into a layer image.

However, the disclosure is not limited thereto, and in one embodiment, the processor 220 may acquire the layer image by inputting the pixel shift value acquired from the first artificial intelligence model together with the first LF image 10 and the second LF image 20 to the second artificial intelligence model.

Also, according to an embodiment, the processor 220 may acquire the layer image by inputting the first LF image 10 and the pixel shift value acquired from the first artificial intelligence model to the second artificial intelligence model.

Also, according to an embodiment, the processor 220 may acquire a layer image by inputting only the first LF image 10 to the second artificial intelligence model.

Figure 5A:
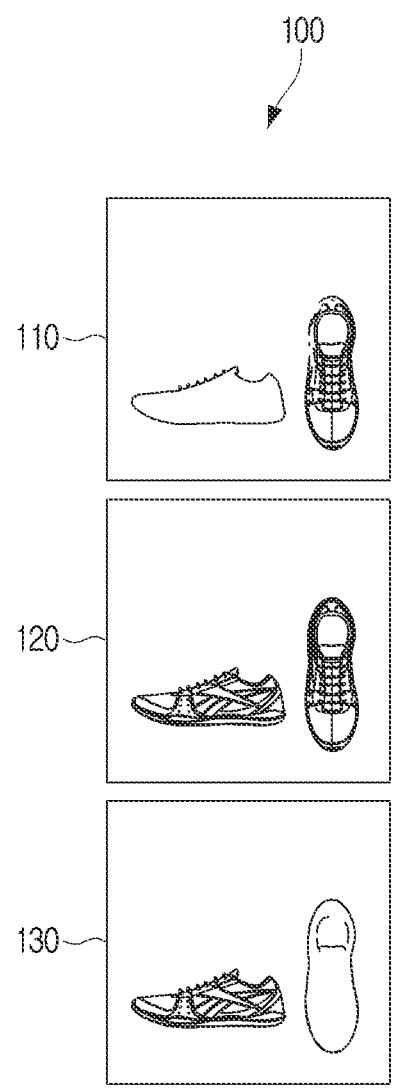
FIG. 5A is a view illustrating three layer images according to an embodiment of the disclosure.

As an embodiment, the layer image 100 may be implemented as three layer images as shown in FIG. 5A. In other words, when the number of panels of the stacked display for displaying the layered image 100 is three, the second artificial intelligence model 3000 may receive the first LF image 10 and output three layer images 100. In this case, the layer image 100 may include a first layer image, a second layer image, and a third layer image.

When the layer image is acquired, the processor 220 may acquire the third LF image 30 by inputting the layer image 100 into the simulation model 4000 for restoring the LF image.

Specifically, the simulation model 4000 may shift each of the first layer image and the third layer image for each view point. In addition, the simulation model 4000 may acquire the third LF image by cropping the shifted first layer image and the shifted third layer image together with the second layer image. Specifically, the simulation model 4000 may acquire the third LF image through a process of shifting the first layer image and the third layer image as shown in FIG. 5C.

FIG. 5A is a view illustrating three layer images according to an embodiment of the disclosure.

Figure 5B:
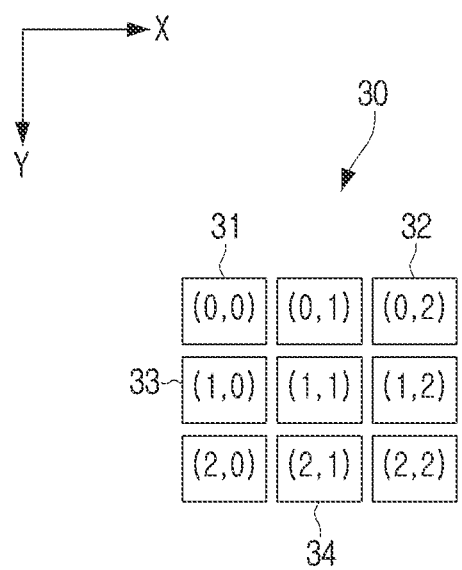
FIG. 5B is a view illustrating a third LF image of a 3×3 view, according to an embodiment of the disclosure.

FIG. 5B is a view illustrating a third LF image of a 3×3 view, according to an embodiment of the disclosure.

Figure 5C:
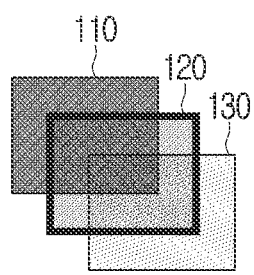
FIG. 5C is a view illustrating a process of restoring a layer image to a third LF image, according to an embodiment of the disclosure.
Figure 5C:
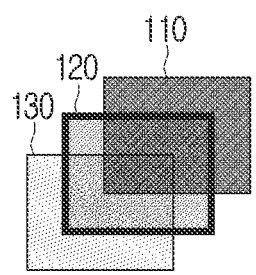
Figure 5C:
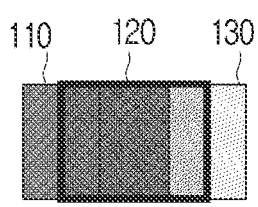
Figure 5C:
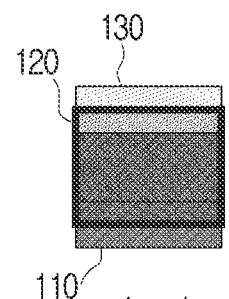

FIG. 5C is a view illustrating a process of restoring a layer image to a third LF image, according to an embodiment of the disclosure.

The simulation model 4000 may restore the third LF image 30 of FIG. 5B through the layer image 100 of FIG. 5A. Specifically, the layer image 100 of FIG. 5A may include a back layer image 110, a middle layer image 120, and a front layer image 130. In addition, as shown in FIG. 5C, the back layer image 110 and the front layer image 130 may be shifted differently for each view point, and the third LF image 30 may be acquired by cropping the shifted back layer image 110 and the front layer image 130 based on the middle layer image 120.

Referring to FIG. 5C, a (0,0) view image 31 in a third LF image 30 may be generated by cropping three layer images based on a middle layer image 120 after a back layer image 110 is shifted by (−Sny, −Snx) based on a middle layer image 120, and, a front layer image 130 is shifted by (Sny, Snx) based on a middle layer image 120.

Here, Sny and Snx are shifting parameters for shifting the front layer image 130 and the back layer image 110, and may be acquired based on information on a depth of the first LF image 10 or by receiving from the user. Also, Sny may be determined as a shifting parameter in a y-axis direction, and Snx may be determined as a shifting parameter in an x-axis direction based on an image.

Figure 10A:
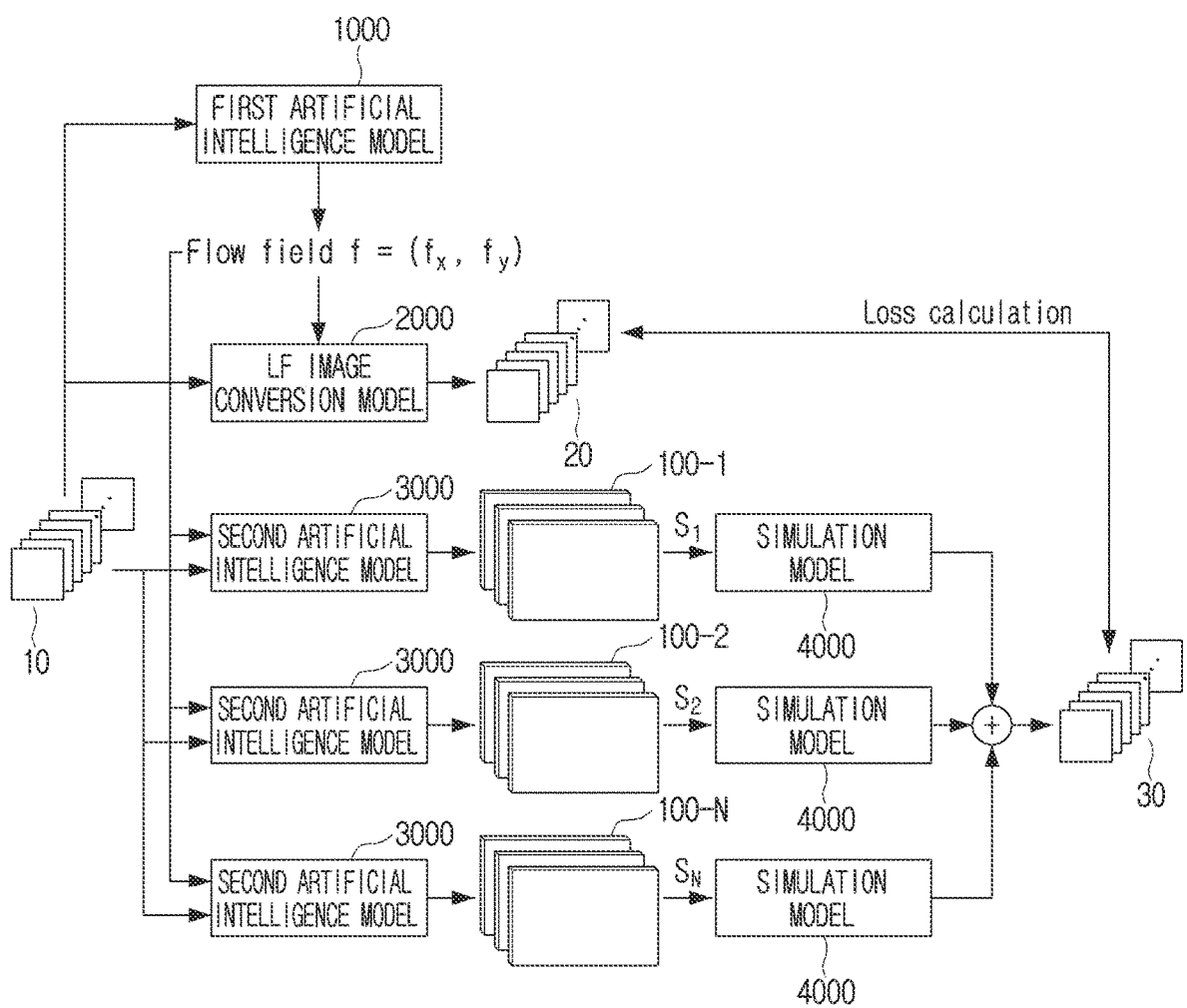
FIG. 10A is a view illustrating a learning method of a second artificial intelligence model for acquiring a plurality of layer images to use a time multiplexing technique, according to an embodiment of the disclosure.
Figure 10B:
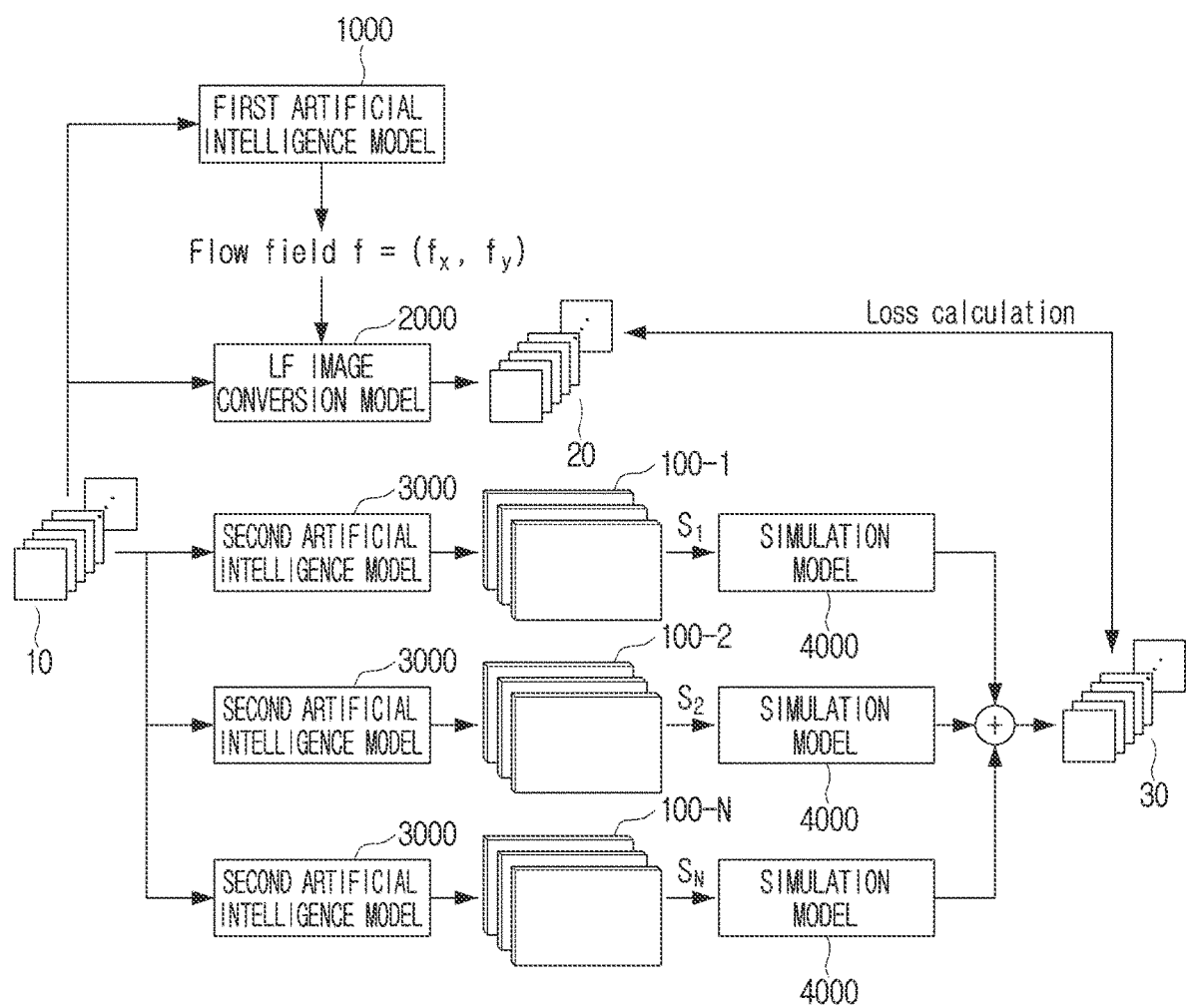
FIG. 10B is a view illustrating a learning method of a second artificial intelligence model for acquiring a plurality of layer images to use a time multiplexing technique, according to another embodiment of the disclosure.

As an example, in order to use a time multiplexing technique for high-speed reproduction of a plurality of layer images, the second artificial intelligence model 3000 may output a plurality of layer images 100-1, 100-2, and 100-3 as shown in FIGS. 10A and 10B. 3, and different shifting parameters 51, S2, and S3 may be applied to each of the plurality of layer images 100-1, 100-2, and 100-3, such that each of the plurality of layer images 100-1, 100-2, 100-3 may be restored as LF images. Details on this will be described below with reference to FIGS. 10A and 10B.

For example, after the back layer image 110 and the front layer image 130 are shifted, the (0,0) view image 31 may be restored by a cropping method of setting an average value of pixel values of an overlapping area of the three layer images to a pixel value of the corresponding area. However, the disclosure is not limited thereto, and the (0,0) view image 31 may be restored by setting a value obtained by multiplying all pixel values of overlapping areas of three layer images as a pixel value of the corresponding area, or by setting a value obtained by adding all pixel values of overlapping areas of three layer images as the pixel value of the corresponding area.

And, a (0,2) view image 32 in the third LF image 30 may be generated by cropping three layer images based on the middle layer image 120, after the back layer image 110 is shifted by (−Sny, Snx) based on the middle layer image 120 and the front layer image 130 is shifted by (Sny, −Snx) based on the middle layer image 120.

And, a (1,0) view image 33 in the third LF image 30 may be generated by cropping three layer images based on the middle layer image 120, after the back layer image 110 is shifted by (0, −Snx) based on the middle layer image 120 and the front layer image 130 is shifted by (0, Snx) based on the middle layer image 120.

And, a (2,1) view image 34 in the third LF image 30 may be generated by cropping three layer images based on the middle layer image 120, after the back layer image 110 is shifted by (Sny, 0) based on the middle layer image 120, and the front layer image 130 is shifted by (−Sny, 0) based on the middle layer image 120.

The process described above may be performed for each view image in the third LF image 30, such that the layer image 100 may be restored to the third LF image 30 through the simulation model 4000.

And, when the third LF image 30 is acquired, the processor 220 may learn, the first artificial intelligence model 1000 and the second artificial intelligence model 3000 based on the second LF image 20 and the third LF image 30. Specifically, the processor 220 may compare the second LF image 20 and the third LF image 30 to acquire a loss function as in Equation 1, and based on the loss function, the first artificial intelligence model 1000 and the second artificial intelligence model 3000 may be learned.

The processor 220 may repeat the process described above to continuously learn the first artificial intelligence model 1000 and the second artificial intelligence model 3000. In addition, the processor 220 may acquire a layer image to be provided to the stacked display by using the learned first Artificial intelligence model and the learned second Artificial intelligence model.

Figure 6A:
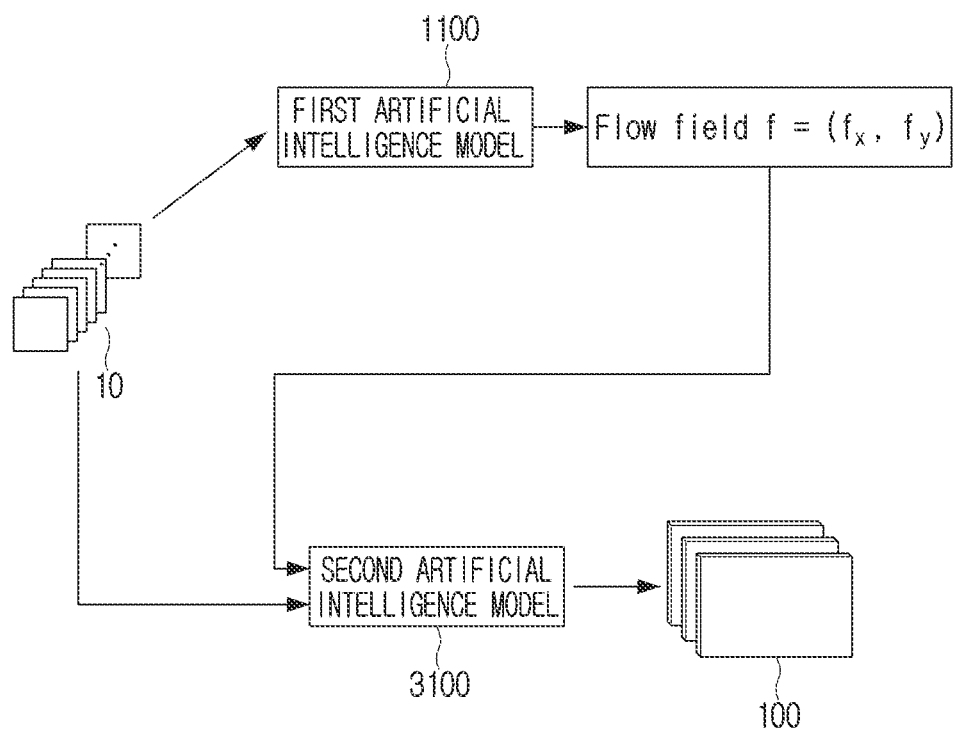
FIG. 6A is a view illustrating a process of acquiring a layer image to be provided to a stacked display according to an embodiment of the disclosure.

FIG. 6A is a view illustrating a process of acquiring a layer image to be provided to a stacked display according to an embodiment of the disclosure.

The processor 220 may acquire the first artificial intelligence model 1100 and the second artificial intelligence model 3100 in which learning has been completed through the process described above. In addition, the processor 220 may acquire a pixel shift value by inputting the first LF image 10 into the first artificial intelligence model 1100 in which learning has been completed. In addition, the processor 220 may input acquire the first LF image 10 and the pixel shift value to the second artificial intelligence model 3100 in which the learning has been completed to provide it to the stacked display.

In addition, the processor 220 may provide the acquired layer image 100 to the stacked display.

Figure 6B:
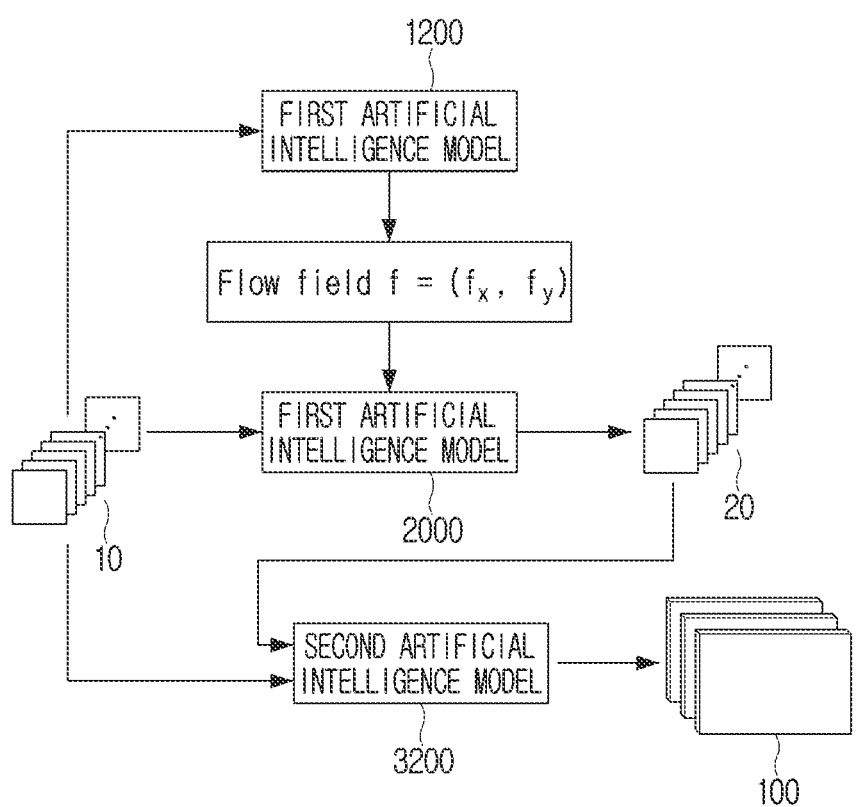
FIG. 6B is a view illustrating a process of acquiring a layer image to be provided to a stacked display according to another embodiment of the disclosure.

FIG. 6B is a view illustrating a process of acquiring a layer image to be provided to a stacked display according to another embodiment of the disclosure.

The processor 220 may acquire the first artificial intelligence model 1200 and the second artificial intelligence model 3200 in which learning has been completed through the process described above. In addition, the processor 220 may acquire a pixel shift value by inputting the first LF image 10 into the first artificial intelligence model 1100 in which learning has been completed. In addition, the processor 220 may input the pixel shift value and the first LF image 10 to the LF image conversion model 2000 to acquire the second LF image 20 in which the first LF image is warped. Also, the processor 220 may input the first LF image 10 and the second LF image 20 into the second artificial intelligence model 3200 in which the learning has been completed to acquire the layer image 100 for providing to the stacked display.

In addition, the processor 220 may provide the acquired layer image 100 to the stacked display.

As an embodiment, the electronic apparatus 200 may further include a stacked display. Here, the stacked display may be implemented in various forms such as a TV, a monitor, a smartphone, a portable multimedia device, a portable communication device, smart glasses, a smart window, a smart watch, a head mount display (HMD), a wearable device, a portable device, a handheld device, a signage, an electric billboard, an advertisement board, a cinema screen, a video wall, or the like, but the form is not limited thereto.

In addition, the stacked display may include a plurality of panels, and a layer image may be displayed on each of the plurality of panels. In other words, the processor 220 may provide a stereoscopic image by displaying the layer image 100 on the stacked display.

As an embodiment, the electronic apparatus 200 may further include a communicator. The communicator may communicate with an external device to transmit or receive data to or from the external device. For example, the communicator may perform wireless communication among at least one of various methods such as cellular communication using at least one of LTE, LTE Advance (LTE-A), code division multiple access (CDMA), wideband CDMA (WCDMA), universal mobile telecommunications system (UMTS), Wireless Broadband (WiBro), or global system for mobile communications (GSM), or the like, wireless fidelity (Wi-Fi), Bluetooth, Bluetooth low energy (BLE), ZigBee, near field communication (NFC), or the like. In addition, the communicator may perform at least one wired communication among various methods such as universal serial bus (USB), high definition multimedia interface (HDMI), digital visual interface (DVI), Thunderbolt, Ethernet, USB port, lightning, or the like.

When the electronic apparatus 200 includes the communicator, the processor 220 may control the communicator to receive the first LF image from an external LF camera or an external device (server). Also, when the electronic apparatus 200 includes the communicator, the processor 220 may control the communicator to transmit the layer image to an external stacked display device.

As an embodiment, the electronic apparatus 200 may further include an input interface. The input interface may receive a user command in various ways from the user. The input interface may transmit the received user command to the processor 220. For this operation, the input interface may use at least one of, for example, a touch panel or a key. The touch panel 252 may, for example, use at least one of electrostatic type, pressure sensitive type, infrared type, or an ultraviolet type, and include a control circuit for it. The touch panel further includes a tactile layer, and provide tactile response to the user. The key may be implemented through, for example, a physical button method, an optical method, or a virtual keypad method combined with a touch panel.

Figure 7:
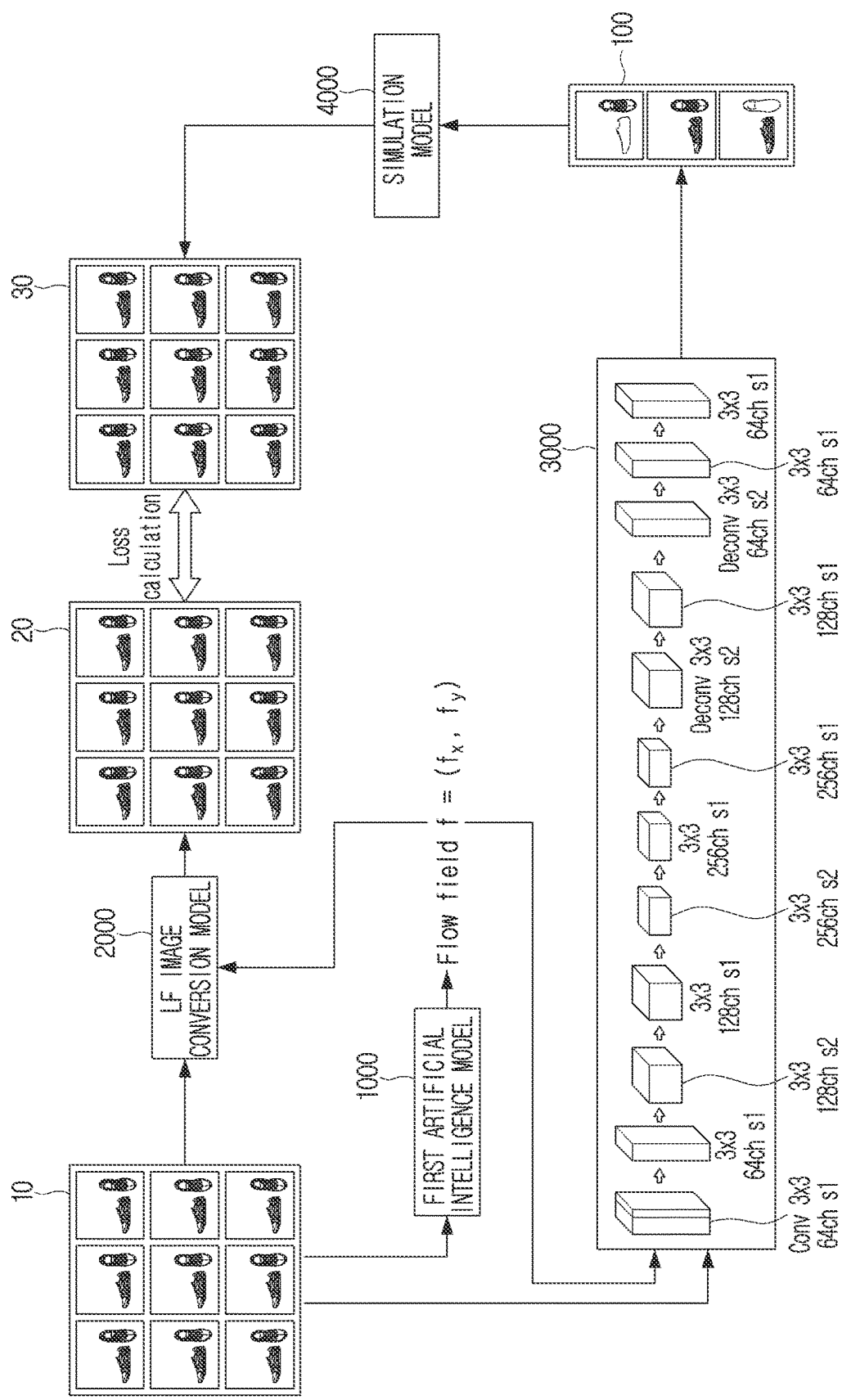
FIG. 7 is a view illustrating a process in which learning of a first artificial intelligence model and a second artificial intelligence model is performed by setting a first LF image and a pixel shift value as input data of a second artificial intelligence model, according to an embodiment of the disclosure.

FIG. 7 is a view illustrating a process in which learning of a first artificial intelligence model and a second artificial intelligence model is performed by setting a first LF image and a pixel shift value as input data of a second artificial intelligence model, according to an embodiment of the disclosure.

The learning method of the first artificial intelligence model and the second artificial intelligence model according to the disclosure is not limited to the embodiment disclosed in FIG. 1. In other words, referring to FIG. 7, the electronic apparatus 200 may input the first LF image 10 to the first artificial intelligence model 1000 to acquire a pixel shift value f, and input the pixel shift value and the first LF to the LF image conversion model 2000 to acquire the second LF image in which the pixel shift value is reflected in the first LF image 10.

Figure 8:
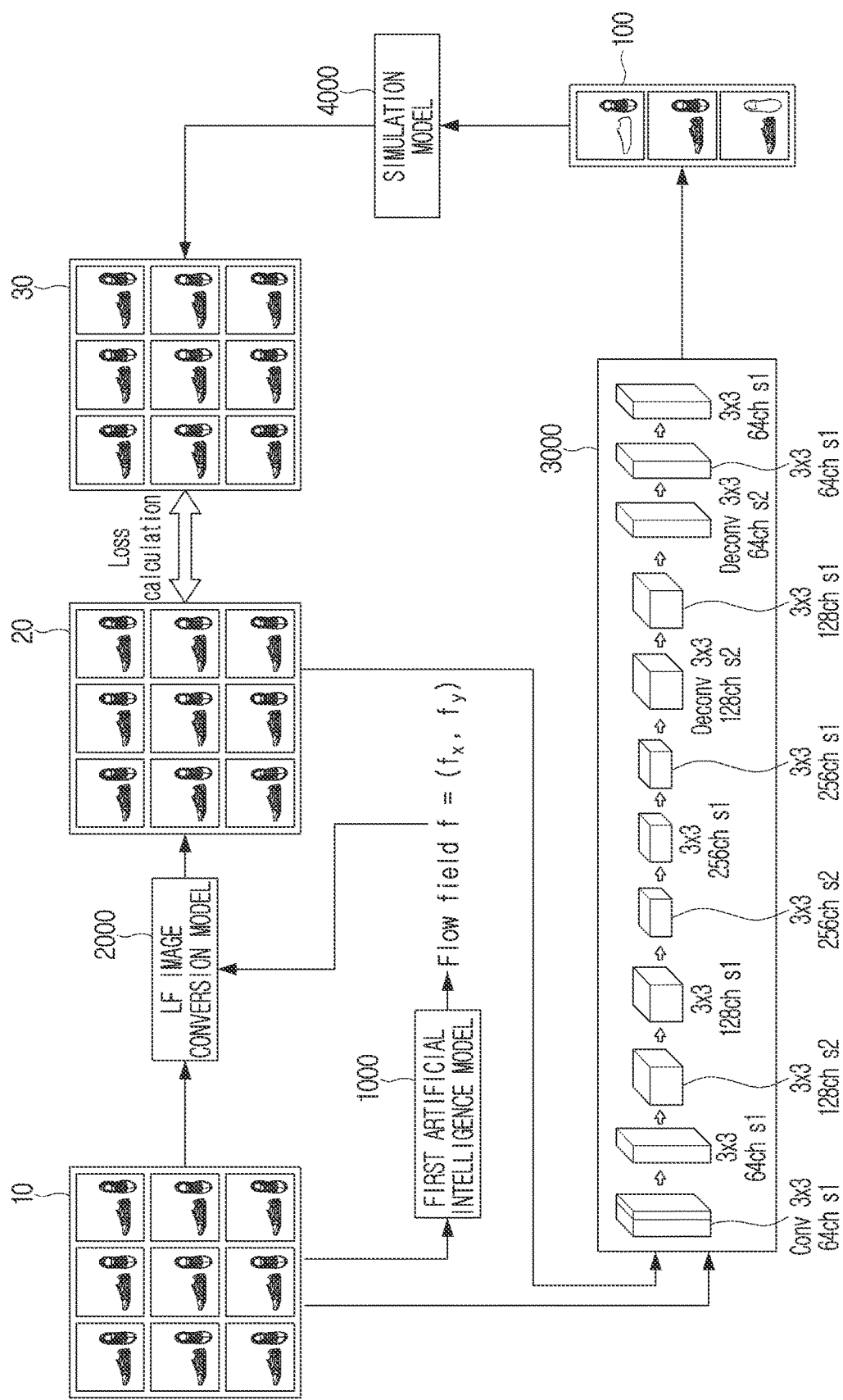
FIG. 8 is a view illustrating a process in which learning of a first artificial intelligence model and a second artificial intelligence model is performed by setting a first LF image and a second LF image as input data of a second artificial intelligence model, according to an embodiment of the disclosure.

Also, the electronic apparatus 200 may acquire the layer image 100 by inputting the first LF image 10 together with the pixel shift value into the second artificial intelligence model 3000. The second artificial intelligence model 3000 according to the disclosure may have a form as shown in FIG. 8. In addition, the second artificial intelligence model 3000 of FIG. 7 may be an artificial intelligence model for outputting the layer image 100 by inputting the first LF image 10 and the pixel shift value.

In addition, the electronic apparatus 200 may restore the layer image to the third LF image 30 through the simulation model 4000.

In addition, the electronic apparatus 200 may learn the first artificial intelligence model 1000 and the second artificial intelligence model 3000 based on the second LF image 20 and the third LF image 30. Specifically, the electronic apparatus 200 may acquire a loss function by comparing the second LF image 20 and the third LF image 30, and learn the first artificial intelligence model 1000 and the second artificial intelligence model 3000 in a way that the loss function decreases. Here, the loss function may be, for example, in the form of Equation 1.

FIG. 8 is a view illustrating a process in which learning of a first artificial intelligence model and a second artificial intelligence model is performed by setting a first LF image and a second LF image as input data of a second artificial intelligence model, according to an embodiment of the disclosure.

Referring to FIG. 8, an electronic apparatus 200 may input a first LF image 10 to a first artificial intelligence model 1000 to acquire a pixel shift value f, and input a pixel shift value and a first LF image 10 to a LF image conversion model 2000 to acquire a second LF image in which a pixel shift value is reflected in a first LF image 10.

In addition, the electronic apparatus 200 may acquire the layer image 100 by inputting the first LF image 10 together with the second LF image 20 into the second artificial intelligence model 3000. The second artificial intelligence model 3000 of FIG. 8 may be an artificial intelligence model for outputting the layer image 100 by receiving the first LF image 10 and the second LF image 20 as inputs.

In addition, the electronic apparatus 200 may restore the layer image as the third LF image 30 through the simulation model 4000.

In addition, the electronic apparatus 200 may learn the first artificial intelligence model 1000 and the second artificial intelligence model 3000 based on the second LF image 20 and the third LF image 30. Specifically, the electronic apparatus 200 may acquire a loss function by comparing the second LF image 20 and the third LF image 30, and learn the first artificial intelligence model 1000 and the second artificial intelligence model 3000 in a way that the loss function decreases. Here, the loss function may be, for example, in the form of Equation 1.

Figure 9:
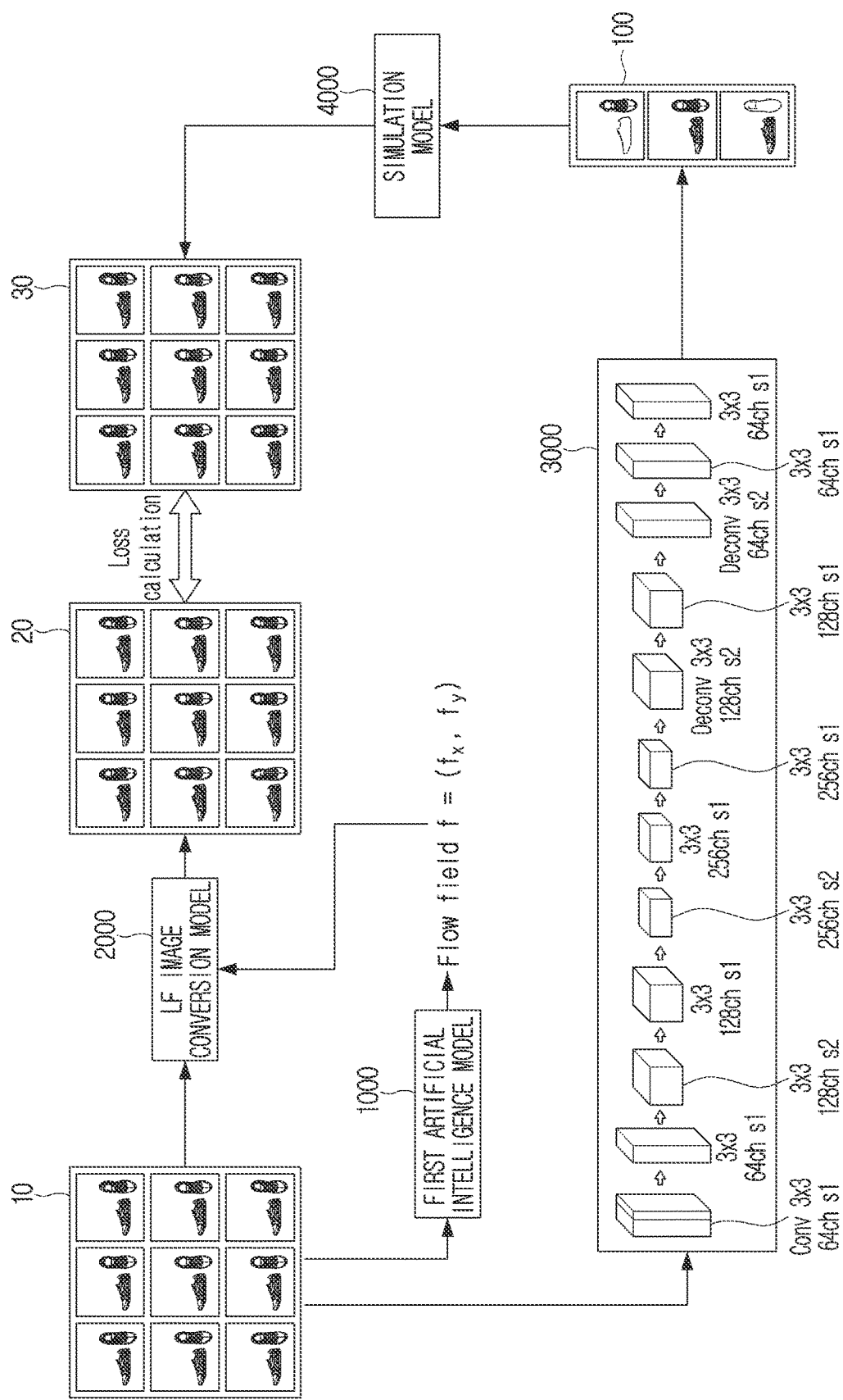
FIG. 9 is a view illustrating a process in which learning of a first artificial intelligence model and a second artificial intelligence model is performed by setting a first LF image as input data of a second artificial intelligence model, according to an embodiment of the disclosure.

FIG. 9 is a view illustrating a process in which learning of a first artificial intelligence model and a second artificial intelligence model is performed by setting a first LF image as input data of a second artificial intelligence model, according to an embodiment of the disclosure.

Referring to FIG. 9, an electronic apparatus 200 may input a first LF image 10 to a first artificial intelligence model 1000 to acquire a pixel shift value f, and input a pixel shift value and a first LF image 10 to a LF image conversion model 2000 to acquire a second LF image in which a pixel shift value is reflected in a first LF image 10.

In addition, the electronic apparatus 200 may acquire the layer image 100 by inputting only the first LF image 10 into the second artificial intelligence model 3000. In other words, the second artificial intelligence model 3000 of FIG. 9 may be an artificial intelligence model for outputting the layer image 100 by receiving the first LF image 10 as an input.

In addition, the electronic apparatus 200 may restore the layer image as the third LF image 30 through the simulation model 4000.

In addition, the electronic apparatus 200 may learn the first artificial intelligence model 1000 and the second artificial intelligence model 3000 based on the second LF image 20 and the third LF image 30. Specifically, the electronic apparatus 200 may acquire a loss function by comparing the second LF image 20 and the third LF image 30, and learn the first artificial intelligence model 1000 and the second artificial intelligence model 3000 in a way that the loss function decreases. Here, the loss function may be, for example, in the form of Equation 1.

As described above, the electronic apparatus 200 may learn the first artificial intelligence model 1000 and the second artificial intelligence model 3000 by variously modifying the input data of the second artificial intelligence model 3000.

FIG. 10A is a view illustrating a learning method of a second artificial intelligence model for acquiring a plurality of layer images to use a time multiplexing technique, according to an embodiment of the disclosure.

A learning method of the first artificial intelligence model 1000 and the second artificial intelligence model 3000 according to the disclosure may be implemented even when acquiring a plurality of layer images in order to apply a time multiplexing technique.

The time multiplexing technique according to the disclosure is a technique of sequentially displaying a plurality of layer images 100-1, 100-2, . . . , 100-N on each panel of a stacked display, and the plurality of layer images 100-1, 100-2, . . . , 100-N) may be reproduced at high speed, thereby increasing a range of an expressible depth. Specifically, the first layer image 100-1 may be displayed on the stacked display at time t1. In other words, each of three images included in a first layer image 100-1 may be displayed on each of the three panels of the stacked display at time t1. In addition, a second layer image 100-2 may be displayed on the stacked display at time t2. Here, a time interval between t1 and t2 may be a short time interval (e.g., 0.01 second). Also, the time interval between t1 and t2 may be changed according to a refresh rate of the stacked display. By repeating this process, the N-th layer image 100-N may be displayed on the stacked display at time tn. In addition, the first layer image 100-1 may be displayed again on the stacked display at time tn+1. In other words, a plurality of layer images are displayed on the stacked display through the time multiplexing technique of repeating and high-speed reproduction of the plurality of layer images 100-1, 100-2, . . . , 100-N acquired through the learned second artificial intelligence model 3000, and thus the range of the depth that can be expressed in the stacked display device may be increased. By using the time multiplexing technique by generating the plurality of layer images in which information on a depth of the first LF image 10 is reflected, a limit of the range of the depth that can be expressed in the stacked display may be removed, artifacts that may be generated in an image rendering for the layer image may be removed, and a rendered image with improved peak to noise ratio (PSNR) may be acquired.

For the time multiplexing technique, the second artificial intelligence model 3000 may output the plurality of layer images, and different shifting parameters may be reflected to the plurality of layer images, respectively, according to the learning of the second artificial intelligence model 3000.

The shifting parameter may indicate a representative depth information value included in the first LF image 10, and the depth information may be information indicating distance information between at least one object included in the LF image.

Specifically, a difference in depth between at least one object included in the first LF image 10 may be identified based on the shifting parameter. For example, a reference area having a shift parameter of 0 among areas within the first LF image 10 may be set. In addition, when a size of a first shifting parameter S1 among the plurality of shifting parameters is greater than a size of a second shifting parameter S2, an area corresponding to the second shifting parameter S2 among the areas included in the first LF image 10 may be relatively closer to a reference area than an area corresponding to the first shifting parameter S1.

As an embodiment, the electronic apparatus 200 may acquire depth information on the first LF image 10 by using a stereo matching technique. The stereo matching technique is a technique for calculating a distance between at least one object included in a plurality of images based on a plurality of images acquired by photographing at least one object from different viewpoints. Specifically, the stereo matching technique is a technique for setting one reference image among a plurality of images photographed from different viewpoints with respect to at least one object, and acquiring depth information included in an image by finding the same area corresponding to one area in the reference image. In other words, disparity information of the plurality of images photographed from different viewpoints with respect to at least one object may be acquired through the stereo matching technique. Particularly, the stereo matching technique may be used to acquire 3D depth information of a plurality of images based on a plurality of images photographed in 2D.

As an embodiment, the electronic apparatus 200 may acquire a depth map for each area of the first LF image 10 by using the stereo matching technique. The depth map refers to a table including depth information for each area of an image. Specifically, the electronic apparatus 200 may set one LF image among the first LF images 10 as a reference image using the stereo matching technique, and acquire the depth map including disparity information indicating a location difference between one area in one reference image and a portion corresponding to one area of the reference image in a plurality of the other images.

In addition, the electronic apparatus 200 may acquire a plurality of shifting parameters based on the acquired depth map. In other words, the electronic apparatus 200 may acquire a plurality of shifting parameters by extracting representative disparity information from the acquired depth map by a number corresponding to the number of a plurality of layer images, or acquire a value acquired by scaling disparity information extracted from the depth map as a shifting parameter. According to the disclosure, the shifting parameter value may be an integer or a real number.

In other words, the number of shifting parameters corresponding to the plurality of layer images (100-1, 100-2, . . . , 100-N) according to the disclosure may be acquired. In other words, referring to FIG. 10A, the first layer image 100-1 may be a layer image in which an expression quality of the area corresponding to the first shifting parameter S1 is improved, and the second layer image may be a layer image in which the expression quality of the area corresponding to S2 is improved.

Referring to FIG. 10A, an electronic apparatus 200 may acquire a pixel shift value f by inputting the first LF image 10 into a first artificial intelligence model 1000. Also, the electronic apparatus 200 may acquire the second LF image 20 by inputting the first LF image 10 and the pixel shift value to the LF image conversion model 2000. Also, the electronic apparatus 200 may input the first LF image 10 and the pixel shift value to the second artificial intelligence model 3000 to acquire the plurality of layer images 100-1, 100-2, . . . , 100-N.

In addition, the electronic apparatus 200 may restore the plurality of layer images (100-1, 100-2, . . . , 100-N) in the LF image format according to a shifting parameter corresponding to each of the plurality of layer images 100-1, 100-2, . . . , 100-N through the simulation model 4000. In other words, through the method shown in FIG. 5C, the electronic apparatus 200 may restore the plurality of layer images 100-1, 100-2, . . . , 100-N in the LF image format.

In addition, the electronic apparatus 200 may acquire the third LF image 30 based on the plurality of restored LF images. For example, the electronic apparatus 200 may acquire the third LF image 30 based on an average value of a plurality of LF images restored through the simulation model 4000. In other words, a first view image in the third LF image 30 may be an image acquired by averaging pixel values included in the plurality of first view images of the plurality of LF images.

In addition, the electronic apparatus 200 may learn the first artificial intelligence model 1000 and the second artificial intelligence model 3000 based on the second LF image 20 and the third LF image 30. As an example, the electronic apparatus 200 may acquire a loss function by comparing the second LF image 20 and the third LF image 30, and learn the first artificial intelligence model 1000 and the second artificial intelligence model 3000 in a way that the loss function decreases.

Here, the loss function may have the same form as Equation 1, but is not limited thereto. In other words, the loss function may be acquired by variously combining L1 norm method for calculating loss function by using mean squared error method for calculating loss function using mean squared error, structural similarity index (SSIM) method for calculating loss function by measuring image quality, least absolute deviations or minimum absolute error, and L2 norm method for calculating loss function using least squares errors.

Through the process described above, when the second artificial intelligence model 3000 for performing a factorization is learned, and the first LF image and the pixel shift value are input to the learned second artificial intelligence model 3000, a plurality of layer images 100-1, 100-2, . . . , 100-N to which a plurality of shifting parameters are reflected may be acquired.

In addition, the learning method of the first artificial intelligence model 1000 and the second artificial intelligence model 3000 for applying the time multiplexing technique is not limited to the learning method of FIG. 10A. In other words, the first artificial intelligence model 1000 and the second artificial intelligence model 3000 may be learned in the same method as in FIG. 10B.

FIG. 10B is a view illustrating a learning method of a second artificial intelligence model for acquiring a plurality of layer images to use a time multiplexing technique, according to an embodiment of the disclosure.

Referring to FIG. 10B, an electronic apparatus 200 may acquire a pixel shift value f by inputting a first LF image 10 into a first artificial intelligence model 1000. In addition, the electronic apparatus 200 may acquire the second LF image 20 by inputting the first LF image 10 and the pixel shift value to the LF image conversion model 2000. In addition, the electronic apparatus 200 may input the first LF image 10 to the second artificial intelligence model 3000 to acquire a plurality of layer images 100-1, 100-2, . . . , 100-N.

In addition, the electronic apparatus 200 may restore the plurality of layer images 100-1, 100-2, . . . , 100-N in the LF image format, and acquire the third LF image 30 based on the restored plurality of LF images according to a shifting parameter corresponding to each of the plurality of layer images 100-1, 100-2, . . . , 100-N through the simulation model 4000. For example, the electronic apparatus 200 may acquire the third LF image 30 based on an average value of the plurality of LF images restored through the simulation model 4000. In other words, the first view image in the third LF image 30 may be an image acquired by averaging and adding pixel values included in the plurality of first view images of the plurality of LF images.

In addition, the electronic apparatus 200 may learn the first artificial intelligence model 1000 and the second artificial intelligence model 3000 based on the second LF image 20 and the third LF image 30. As an example, the electronic apparatus 200 may acquire a loss function by comparing the second LF image 20 and the third LF image 30, and learn the first artificial intelligence model 1000 and the second artificial intelligence model 3000 in a wat that the loss function decreases.

Through the process described above, when the second artificial intelligence model 3000 for performing the factorization is learned, and the first LF image and the pixel shift value are input to the learned second artificial intelligence model 3000, a plurality of layer images 100-1, 100-2, . . . , 100-N to which the shifting parameter is reflected may be acquired.

FIG. 11 is a flowchart illustrating a method of controlling an electronic apparatus, according to an embodiment of the disclosure.

Referring to FIG. 11, an electronic apparatus 200 may acquire a first LF image 10 at different viewpoints at operation S1110. Also, the electronic apparatus 200 may input the first LF image 10 to the first artificial intelligence model 1000 to acquire a pixel shift value for converting pixels in the first LF image 10 at operation S1120.

In addition, the electronic apparatus 200 may acquire the second LF image 20 by converting the pixels in the first LF image 10 according to the pixel shift value at operation 51130. Specifically, the electronic apparatus 200 may move the pixels of each of the plurality of view images according to the pixel shift value corresponding to each of the plurality of view images included in the first LF image 10 to acquire the second LF image 20. In other words, the electronic apparatus 200 may move pixels in a first view image included in the first LF image 10 according to the first pixel shift value corresponding to the first view image to acquire the first view image of the second LF image 20, and the electronic apparatus 200 may acquire the second LF image 20 by applying this process to all view images included in the first LF image 10.

And, as an example, the pixel shift value may include sub-pixel shift values corresponding to each pixel. In other words, the electronic apparatus 200 may move each pixel in the first view image included in the first LF image 10 according to the sub-pixel shift value included in the first pixel shift value to acquire the first view image of the second LF image 20.

In addition, the electronic apparatus 200 may input the first LF image 10 and the second LF image 20 to the second artificial intelligence model 3000 for converting the LF image into a layer image to acquire the layer image 100 at operation S1140. However, the disclosure is not limited thereto, and the electronic apparatus 200 may input the first LF image 10, the second LF image 20, and the pixel shift value to the second artificial intelligence model 3000 to acquire the layer image 100. Also, the electronic apparatus 200 may acquire the layer image 100 by inputting the first LF image 10 to the second artificial intelligence model 3000.

Also, the electronic apparatus 200 may acquire the third LF image 30 by inputting the acquired layer image 100 to the simulation model 4000 for restoring the LF image at operation S1150.

For example, the layer image 100 may include a first layer image, a second layer image, and a third layer image. In this case, the electronic apparatus 200 may shift each of the first layer image and the third layer image for each view point, and crop the shifted first layer image and the shifted third layer image together with the second layer image to acquire the third LF image.

And, based on the second LF image 20 and the third LF image 30, the electronic apparatus 200 may learn the first artificial intelligence model 1000 and the second artificial intelligence model 3000 (1160). Specifically, the electronic apparatus 200 may compare the second LF image 20 with the third LF image 30 to acquire a loss function, and learn the first artificial intelligence model 1000 and the second artificial intelligence model 3000 based on the loss function.

In addition, the electronic apparatus 200 may repeat the process described above to acquire the learned first artificial intelligence model and the second artificial intelligence model. Also, the electronic apparatus 200 may input the first LF image 10 to the learned first artificial intelligence model, acquire a pixel shift value, and convert pixels in the first LF image 10 according to the pixel shift value to acquire a second LF image by conversion. Also, the electronic apparatus 200 may acquire the layer image by inputting the first LF image 10 and the second LF image to the learned second artificial intelligence model.

However, the disclosure is not limited thereto, and the electronic apparatus 200 may input the first LF image 10 to the learned first artificial intelligence model to acquire a pixel shift value, and input the first LF image 10 and the pixel shift value to the learned second artificial intelligence model to acquire the layer image.

When the layer image is acquired from the learned first artificial intelligence model, the electronic apparatus 200 may provide the acquired layer image to the stacked display.

It should be understood to include various modifications, equivalents, and/or alternatives of the embodiments herein. In relation to explanation of the drawings, similar drawing reference numerals may be used for similar constituent elements.

In the present application, the terms "include" and "comprise" designate the presence of features, numbers, steps, operations, components, elements, or a combination thereof that are written in the specification, but do not exclude the presence or possibility of addition of one or more other features, numbers, steps, operations, components, elements, or a combination thereof.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B. The expression "1", "2", "first", or "second" as used herein may modify a variety of elements, irrespective of order and/or importance thereof, and only to distinguish one element from another. Accordingly, without limiting the corresponding elements.

When an element (e.g., a first element) is "operatively or communicatively coupled with/to" or "connected to" another element (e.g., a second element), an element may be directly coupled with another element or may be coupled through the other element (e.g., a third element). On the other hand, when an element (e.g., a first element) is "directly coupled with/to" or "directly connected to" another element (e.g., a second element), an element (e.g., a third element) may not be existed between the other element.

In the description, the term "configured to" may be changed to, for example, "suitable for", "having the capacity to", "designed to", "adapted to", "made to", or "capable of"

under certain circumstances. The term "configured to (set to)" does not necessarily mean "specifically designed to" in a hardware level. Under certain circumstances, the term "device configured to" may refer to "device capable of" doing something together with another device or components. For example, the phrase "a coprocessor configured (or configured to perform) A, B, and C" may mean a generic-purpose processor (e.g., a CPU or an application processor) capable of performing corresponding operations by performing a dedicated processor for performing the corresponding operation (e.g., embedded processor), or executing one or more software programs stored in a memory device.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions. For example, the module may be configured as an application-specific integrated circuit (ASIC).

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various embodiments, may be sequential, parallel, or both, executed iteratively or heuristically, or at least some operations may be performed in a different order, omitted, or other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. A method for controlling an electronic apparatus comprising:
   inputting a first light field (LF) image set, the first LF image set comprising a plurality of view images of different viewpoints of a same object, to a first artificial intelligence model to acquire a pixel shift value including a sub-pixel shift value corresponding to each pixel for converting pixels in the first LF image set;
   acquiring a second LF image set by converting the pixels in the first LF image set according to the pixel shift value;
   inputting the first LF image set and the second LF image set to a second artificial intelligence model for converting the LF image sets to a layer image to acquire the layer image;
   inputting the acquired layer image to a simulation model for restoring the LF image sets to acquire a third LF image set; and
   transmitting, to an external server, learning data for learning the first artificial intelligence model and the second artificial intelligence model based on the second LF image set and the third LF image set.

2. The method of claim 1, wherein the acquiring of the second LF image set comprises acquiring the second LF image set by moving, according to a pixel shift value corresponding to each of the plurality of view images included in the first LF image set, pixels of each of the plurality of view images.

3. The method of claim 2, wherein the acquiring of the second LF image set comprises acquiring a first view image of the second LF image set by moving, according to a first pixel shift value corresponding to a first view image, pixels in the first view image included in the first LF image set.

4. The method of claim 3,
   wherein the acquiring of the first view image of the second LF image set comprises acquiring the first view image of the second LF image set by moving each pixel in the first view image included in the first LF image set according to the sub-pixel shift value included in the first pixel shift value.

5. The method of claim 1, wherein the acquiring of the layer image comprises inputting the first LF image set, the second LF image set, and the pixel shift value to the second artificial intelligence model to acquire the layer image.

6. The method of claim 1,
   wherein the layer image is configured to include a first layer image, a second layer image, and a third layer image, and
   wherein the acquiring of the third LF image set comprises:
      shifting each of the first layer image and the third layer image for each view point, and
      acquiring the third LF image set by cropping the shifted first layer image and the shifted third layer image together with the second layer image.

7. The method of claim 1, wherein the learning comprises:
   acquiring a loss function by comparing the second LF image set with the third LF image set; and learning the first artificial intelligence model and the second artificial intelligence model based on the loss function.

8. The method of claim 1, further comprising:
inputting the first LF image set to the learned first artificial intelligence model to acquire the pixel shift value;
acquiring the second LF image set by converting the pixels in the first LF image set according to the pixel shift value; and
inputting the first LF image set and the second LF image set to the learned second artificial intelligence model to acquire a layer image.

9. The method of claim 1, further comprising:
inputting the first LF image set to the learned first artificial intelligence model to acquire the pixel shift value; and
inputting the first LF image set and the pixel shift value to the learned second artificial intelligence model to acquire the layer image.

10. The method of claim 8, further comprising:
providing the layer image to a stacked display.

11. An electronic apparatus comprising:
a memory for storing at least one instruction; and
a processor for executing the at least one instruction stored in the memory to control the electronic apparatus,
wherein the processor is configured to:
input a first light field (LF) image set, the first LF image set comprising a plurality of view images of different viewpoints of a same object, to a first artificial intelligence model to acquire a pixel shift value including a sub-pixel shift value corresponding to each pixel for converting pixels in the first LF image set,
acquire a second LF image set by converting the pixels in the first LF image set according to the pixel shift value,
input the first LF image set and the second LF image set to a second artificial intelligence model for converting the LF image set to a layer image to acquire the layer image,
input the acquired layer image to a simulation model for restoring the LF image sets to acquire a third LF image set, and
transmit, to an external server, learning data to learn the first artificial intelligence model and the second artificial intelligence model based on the second LF image set and the third LF image set.

12. The electronic apparatus of claim 11, wherein the processor is further configured to acquire the second LF image set by moving, according to a pixel shift value corresponding to each of the plurality of view images included in the first LF image set, pixels of each of the plurality of view images.

13. The electronic apparatus of claim 12, wherein the processor is further configured to acquire a first view image of the second LF image set by moving, according to a first pixel shift value corresponding to a first view image, pixels in the first view image included in the first LF image set.

14. The electronic apparatus of claim 13,
wherein the processor is further configured to acquire the first view image of the second LF image set by moving each pixel in the first view image included in the first LF image set according to the sub-pixel shift value included in the first pixel shift value.

15. The electronic apparatus of claim 11, wherein the processor is further configured to input the first LF image set, the second LF image set, and the pixel shift value to the second artificial intelligence model to acquire the layer image.

16. The electronic apparatus of claim 11, wherein the restoring of the LF image set to acquire a third LF image set comprises setting an average value of pixel values of an overlapping area of a plurality of layer images to a pixel value of a corresponding area.

17. The electronic apparatus of claim 11, wherein the restoring of the LF image set to acquire a third LF image set comprises setting a value obtained by multiplying pixel values of overlapping areas of a plurality of layer images as a pixel value of a corresponding area.

18. The electronic apparatus of claim 11, wherein the restoring of the LF image set to acquire a third LF image set comprises setting a value obtained by adding pixel values of overlapping areas of a plurality of layer images as a pixel value of a corresponding area.

* * * * *